H. H. Ensminger,
Derrick.
No. 104,947.    Patented July 5, 1870.
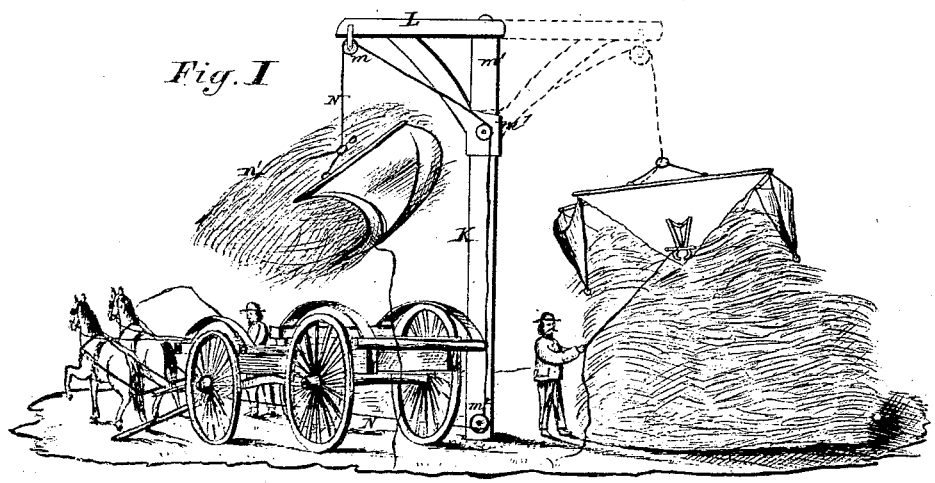
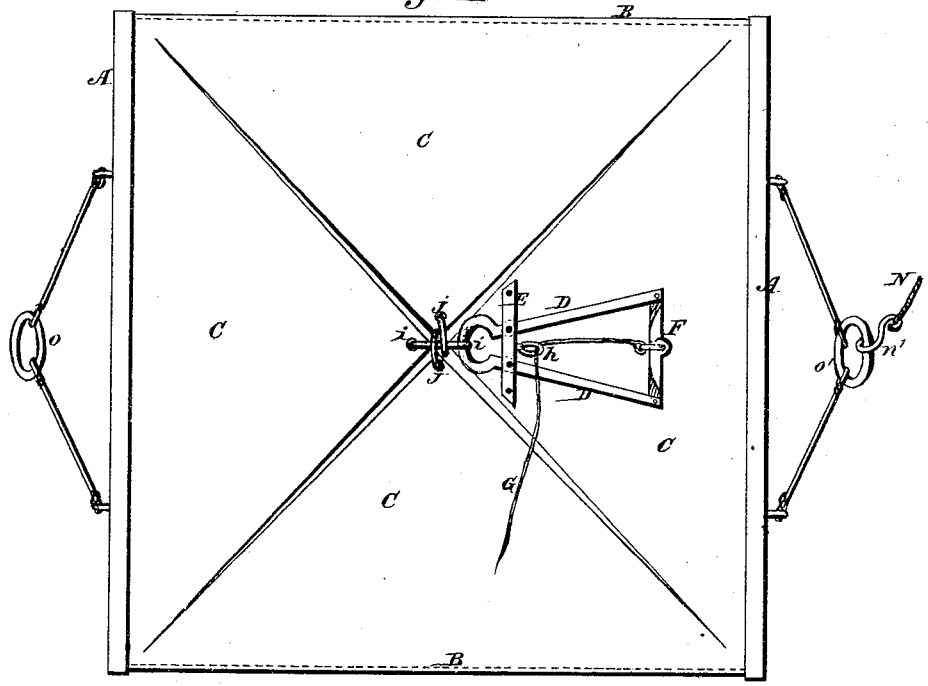

United States Patent Office.

HENRY H. ENSMINGER, OF BUFFALO, NEW YORK.

Letters Patent No. 104,947, dated July 5, 1870.

IMPROVEMENT IN HAY-UNLOADER.

The Schedule referred to in these Letters Patent and making part of the same.

I, HENRY H. ENSMINGER, of the city of Buffalo, county of Erie and State of New York, have invented a certain new and improved Hay-Unloader, of which the following is a specification.

The first part of my invention relates to a rectangular frame, composed of two scantlings and two connecting-ropes, upon opposite sides respectively, and four or more triangular pieces of canvas attached to said ropes and rods, and so arranged that all the sections of canvas are held together in the center, for the purpose of forming a receptacle for a quantity of hay upon a wagon, by means of which the hay may be lifted in a body and moved to a point above the stack, and, by disconnecting the central points of the said sections of canvas, the hay may be allowed to drop, through the frame, upon the stack.

The second part of my invention relates to a device for locking or holding together the contiguous ends of the sections of canvas in the center of the frame, which device is so constructed that, when a quantity of hay is lifted to a point above the stack upon which it is desired to deposit the hay, the device may be unlocked and the ends of the canvas disconnected by pulling a rope attached to the locking-device.

In the accompanying drawing—

Figure I is a perspective view of my improved hay-unloader, showing its operation.

Figure II is a plan view of the bottom of the canvas and locking device.

Letters of like name and kind refer to like parts in each of the figures.

A A represent two scantlings, poles, or rods, and B B, two ropes connecting the same, forming a rectangular frame, which supports the canvas.

C C C C represent four triangular pieces of canvas, one of which is connected to each of the scantlings and ropes A B, in a manner that their ends meet in the center of the frame.

A device for holding the central ends of the canvas together is constructed as follows:

Two levers, D D, are pivoted upon a slotted bar, E, which is connected to one of the triangular pieces of canvas near its point or end.

The ends of the levers, projecting toward the center of the frame, form a loop when brought together by the action of the knuckle-jointed bar F, which connects the opposite ends of the levers, i. e., when the bar F forms a straight connection.

A rope, G, is attached to a bail upon the central pivot of the jointed bar F, and passed through a ring, h, near the slotted bar E.

An oblong link, i, is attached to the end of the piece of canvas opposite to that which carries the locking device.

The ends of the other pieces of canvas are provided with rings j, large enough to pass over the link i.

The operation of this locking device is as follows:

The rings j j are slipped over the link i, and the latter locked into the loop formed by the levers D D.

The knuckle-jointed bar F is straightened out, and thus the ends of the four pieces of canvas are firmly and securely held together, so as to form a receptacle for a quantity of hay.

The canvas is first spread out upon the bottom of the wagon, then the wagon is loaded with hay and drawn up alongside of the stack to which it is desired to add the hay upon the wagon.

A post, K, is placed upon the ground, between the wagon and the stack, with a cross-beam, L, and sheaves $m$ $m^1$ $m^2$.

A rope, N, with a hook, $n'$, is then passed through a ring, $o$, connected to one of the scantlings A, thrown over the load, and hooked onto a similar ring, $o'$, upon the other scantling. The horses are then hitched to the other end of the rope which passes over the sheaves $m$ $m^1$ $m^2$, and thus the whole wagon load of hay is lifted up bodily, and may easily be swung around to the place above the stack upon which it is designed to put it, as shown by the dotted lines, Fig. I. Then the rope G is pulled, which disconnects the link i and rings j j from the grappling levers D D, and as the canvas parts in the center, the entire load is deposited upon the stack, passing through the frame A B in its descent.

When hay or straw is to be unloaded in a barn or hay-loft, the pole K and cross-beam L may be dispensed with, and the system of sheaves secured to the frame-work of the buildings.

When very large loads are carried upon the wagon, two canvas carriers may be used, one being placed upon the bottom and the other in the middle of the load.

Claims.

I claim as my invention—

1. The combination and arrangement of the scantlings A A, ropes B B, and sections of canvas C C C C, the sections being connected in the center to retain the load, and disconnected to discharge the same, said parts forming a device for handling hay or straw in bulk, substantially as herein described.

2. In combination with the above, a locking device, composed of two levers, D D, the slotted bar E, knuckle-jointed bar F, rope G, and ring h, together with the link i and rings j j, substantially as described and for the purposes set forth.

HENRY H. ENSMINGER.

Witnesses:
B. H. MUEHLE,
EDWARD WILHELM.